(12) United States Patent
Inoue

(10) Patent No.: US 7,710,083 B2
(45) Date of Patent: May 4, 2010

(54) ELECTRONIC DEVICE, METHOD FOR CONTROLLING THE SAME, AND OPTICAL SEMICONDUCTOR MODULE

(75) Inventor: Shingo Inoue, Yamanashi (JP)

(73) Assignee: Eudyna Devices Inc., Yamanashi (JP)

( * ) Notice: Subject to any disclaimer, the term of this patent is extended or adjusted under 35 U.S.C. 154(b) by 409 days.

(21) Appl. No.: 11/727,682

(22) Filed: Mar. 28, 2007

(65) Prior Publication Data

US 2007/0229040 A1    Oct. 4, 2007

(30) Foreign Application Priority Data

Mar. 30, 2006 (JP) .............................. 2006-096050

(51) Int. Cl.
G05F 1/00    (2006.01)
(52) U.S. Cl. .................................................... 323/222
(58) Field of Classification Search ................ 323/222, 323/241; 398/202, 204
See application file for complete search history.

(56) References Cited

U.S. PATENT DOCUMENTS

| 6,091,940 | A | * | 7/2000 | Sorrells et al. ............... 455/118 |
| 6,154,015 | A | * | 11/2000 | Ichiba ........................ 323/225 |
| 6,229,932 | B1 | * | 5/2001 | Fukashiro et al. ............. 385/16 |
| 7,031,615 | B2 | * | 4/2006 | Gentile ........................ 398/155 |
| 7,173,377 | B2 | * | 2/2007 | Park et al. ................. 315/169.1 |
| 7,321,735 | B1 | * | 1/2008 | Smith et al. .................. 398/202 |
| 2005/0047181 | A1 | | 3/2005 | Yamamoto et al. |
| 2006/0001409 | A1 | * | 1/2006 | Hachiya ...................... 323/282 |
| 2006/0208718 | A1 | * | 9/2006 | Nitta et al. .................... 323/288 |
| 2007/0195565 | A1 | * | 8/2007 | Noma .......................... 363/49 |

FOREIGN PATENT DOCUMENTS

| JP | 2004-208365 A | | 7/2004 |
| JP | 2005-080395 A | | 3/2005 |
| JP | 2005-245152 A | | 9/2005 |
| JP | 2005245152 A | * | 9/2005 |

OTHER PUBLICATIONS

Japanese Notification of Reason(s) for Refusal dated Dec. 8, 2009, issued in Japanese patent application No. 2006-096050.

* cited by examiner

*Primary Examiner*—Adolf Berhane
*Assistant Examiner*—Yemane Mehari
(74) *Attorney, Agent, or Firm*—Westerman, Hattori, Daniels & Adrian, LLP

(57) ABSTRACT

An electronic device includes a DC/DC converter supplied with an external power supply, and an electronic circuit having a power supply input to which an output of the DC/DC converter is supplied. A converted voltage that is the output of the DC/DC converter is lower than a center value of a recommended operating condition for a voltage of the power supply input of the electronic circuit.

8 Claims, 8 Drawing Sheets

ELECTRONIC DEVICE, METHOD FOR CONTROLLING THE SAME, AND OPTICAL SEMICONDUCTOR MODULE

BACKGROUND OF THE INVENTION

1. Field of the Invention

This invention generally relates to an electronic device, a method for controlling the same, and an optical semiconductor device. More particularly, the present invention relates to an electronic device equipped with a DC/DC converter, a method for controlling such an electronic device, and an optical semiconductor module.

2. Description of the Related Art

Electronic devices having electronic circuits are used in various fields. Electronic circuits built in the electronic devices are supplied as semiconductor devices such as integrated circuits. The electronic devices are supplied with a power supply voltage that falls within a defined range prescribed as a recommended operating condition. The recommended operating condition is an operating condition guaranteed by the supplier of the electronic circuits. The electronic circuits incorporated into the electronic devices are supplied with the power supply voltages within the range of the recommended operating condition.

A conventional electronic device will now be described. FIG. 1 is a block diagram of an electronic device $60a$ equipped with an electronic circuit 50. The electronic device $60a$ may include multiple electronic circuits 50. Here, it is assumed that the electronic device $60a$ has one electronic circuit 50. The recommended operating condition for a power supply input to the electronic circuit 50 is assumed as $Vc(1\pm\alpha)$ where Vc is the center value of the recommended operating condition for the voltage of the power supply input to the electronic circuit 50, while the lower limit Vmin of the recommended operating condition is equal to $Vc(1-\alpha)$ and the upper limit Vmax thereof is equal to $Vc(1+\alpha)$. When the electronic circuit 50 is supplied with Vc, Vmin or Vmax, the electronic circuit 50 consumes current Ic, $Imin=Ic(1-\beta)$ or $Imax=Ic(1+\beta)$, respectively. The power supply inputs of the electronic circuit 50 are directly connected to an external power supply outside of the electronic device $60a$ and ground. Generally, the power supply voltage Vc is applied to the electronic circuit 50.

FIG. 2 is a block diagram for explaining the voltage of an external power supply generally used. As shown in the left-side portion of FIG. 2, the recommended operating condition for the power supply input voltage of the electronic circuit 50 ranges from Vmin to Vmax at the center of V1. When a variation (assumed as Vs) in the power supply voltage is considered, the usable range as the power supply input to the electronic circuit 50 is V2 that ranges from Vmin+Vs to Vmax−Vs. When it is further considered that there is a voltage drop Vd that develops in a connector and a substrate line in the circuit from the external power supply to the electronic circuit 50, the voltage supplied from the external power supply falls within a range V3 of Vmin+Vs+Vd to Vmax−Vs+Vd. When variations in the power supply voltage are considered as mentioned above, the voltage of the external power supply is used in the vicinity of Vc. If the circuit is greatly affected by the voltage drop, the voltage of the external power supply is used in the vicinity of Vc+Vd.

When it is assumed that Vc is supplied from the external power supply for the electronic device $60a$ without considering the influence of the voltage drop, the voltage of the power supply input to the electronic circuit 50 is Vc, and power P of the electronic device $60a$ (that is, the electronic circuit 50) is expressed as follows:

$$P = Vc \times Ic \qquad (1)$$

where Ic is current consumed in the electronic circuit 50 as has been defined previously.

In the electronic device $60a$, Vmax is the allowable maximum voltage of the external power supply as long as the recommended operating condition of the power supply input to the electronic circuit 50 is satisfied. When Vmax is supplied from the external power supply, the maximum power Pmax of the electronic circuit 50 is expressed as follows:

$$P\max = Vc(1+\alpha) \times Ic(1+\beta) \qquad (2)$$

As described above, when the voltage of the external power supply varies, the power of the electronic device $60a$ is changed.

Japanese Patent Application Publication No. 2005-245152 discloses a DC/DC converter.

The electronic devices are required to reduce power consumed in the internal electronic circuits.

SUMMARY OF THE PRESENT INVENTION

The present invention has been made taking the above into consideration and aims at reducing power consumed in electronic circuits.

According to an aspect of the present invention, there is provided an electronic device including: a DC/DC converter supplied with an external power supply; and an electronic circuit having a power supply input to which an output of the DC/DC converter is supplied, a converted voltage that is the output of the DC/DC converter being lower than a center value of a recommended operating condition for a voltage of the power supply input of the electronic circuit. With this structure, the power consumption of the electronic device can be reduced.

According to another aspect of the present invention, there is provided an optical semiconductor module including: a conversion circuit that performs a conversion between an electric signal and an optical signal; and an electronic device communicating with the conversion circuit, the electronic device including: a DC/DC converter supplied with an external power supply; and an electronic circuit having a power supply input to which an output of the DC/DC converter is supplied, a converted voltage that is the output of the DC/DC converter being lower than a center value of a recommended operating condition for a voltage of the power supply input of the electronic circuit.

According to yet another aspect of the present invention, there is provided a method for controlling an electronic device equipped with an electronic circuit including: inputting an external power supply; converting a voltage of the external power supply into a voltage lower than a center value of a recommended operating condition for a voltage of the power supply input of the electronic circuit; and supplying a converted voltage to the electronic circuit.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given, with reference to the accompanying drawings, of embodiments of the present invention.

First Embodiment

Figure 1:
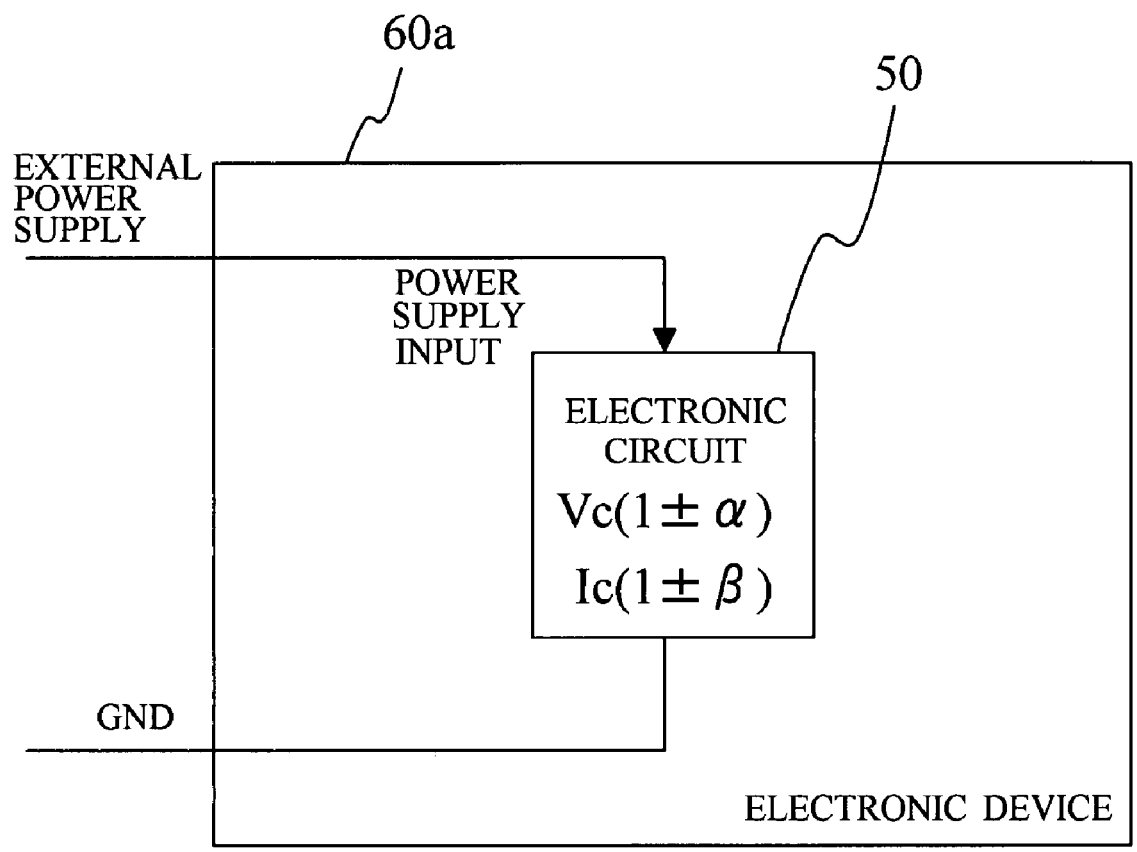
FIG. 1 is a block diagram of a conventional electronic device.
Figure 2:
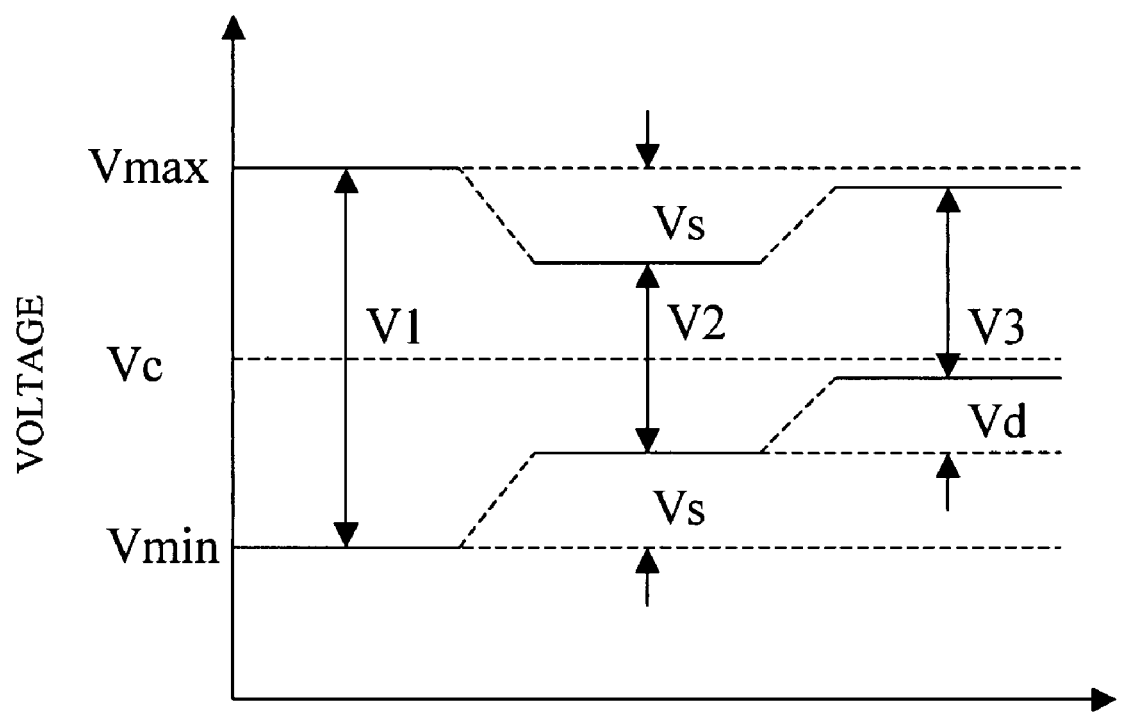
FIG. 2 is a block diagram of a power supply voltage used for the conventional electronic device shown in FIG. 1.
Figure 3:
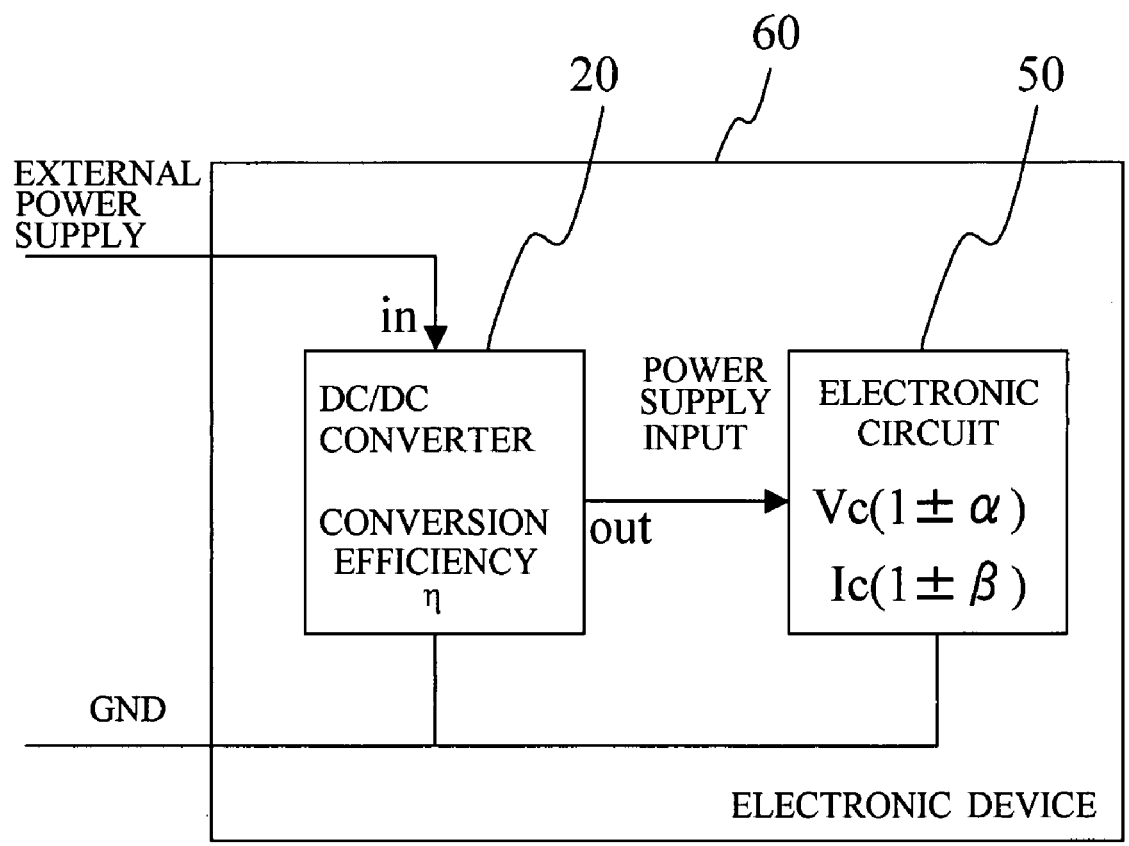
FIG. 3 is a block diagram of an electronic device in accordance with a first embodiment.

FIG. 3 is a block diagram of an electronic device configured in accordance with a first embodiment of the present invention. As compared to the conventional device shown in FIG. 1, there is a difference that an electronic device 60 has a DC/DC converter 20 having a conversion efficiency η. An external power supply is applied to an input "in" of the DC/DC converter 20, and an output "out" thereof is applied to a power supply input of the electronic circuit 50. The voltage of the external power supply may, for example, be the center value Vc of the recommended operating condition. However, an arbitrary voltage may be used. The DC/DC converter 20 converts an arbitrary voltage into a voltage Vcon, which is then applied to the electronic circuit 50. When the output of the DC/DC converter 20 is highly accurate with respect to Vc×α(Vc−Vmin), the DC/DC converter 20 is capable of stably outputting the converted voltage Vcon even if the power supply voltage Vc varies. Thus, the power supply input to the electronic circuit 50 may be set to the lower limit Vmin of the recommended operating condition. In this case, the power P of the electronic device 60 supplied with the external power supply Vc is expressed as follows:

$$P = (Vc(1-\alpha) \times Ic(1-\beta))/\eta \quad (3)$$

When the electronic device 60 is supplied with Vmax from the external power supply, the power Pmax is expressed as follows:

$$P\text{max} = (Vc(1-\alpha) \times Ic(1-\beta))/\eta \quad (4)$$

It can be seen from the above that the electronic device 60 consumes a constant amount of power even when the external power supply varies. This is different from the conventional electronic device 60a.

Figure 4:
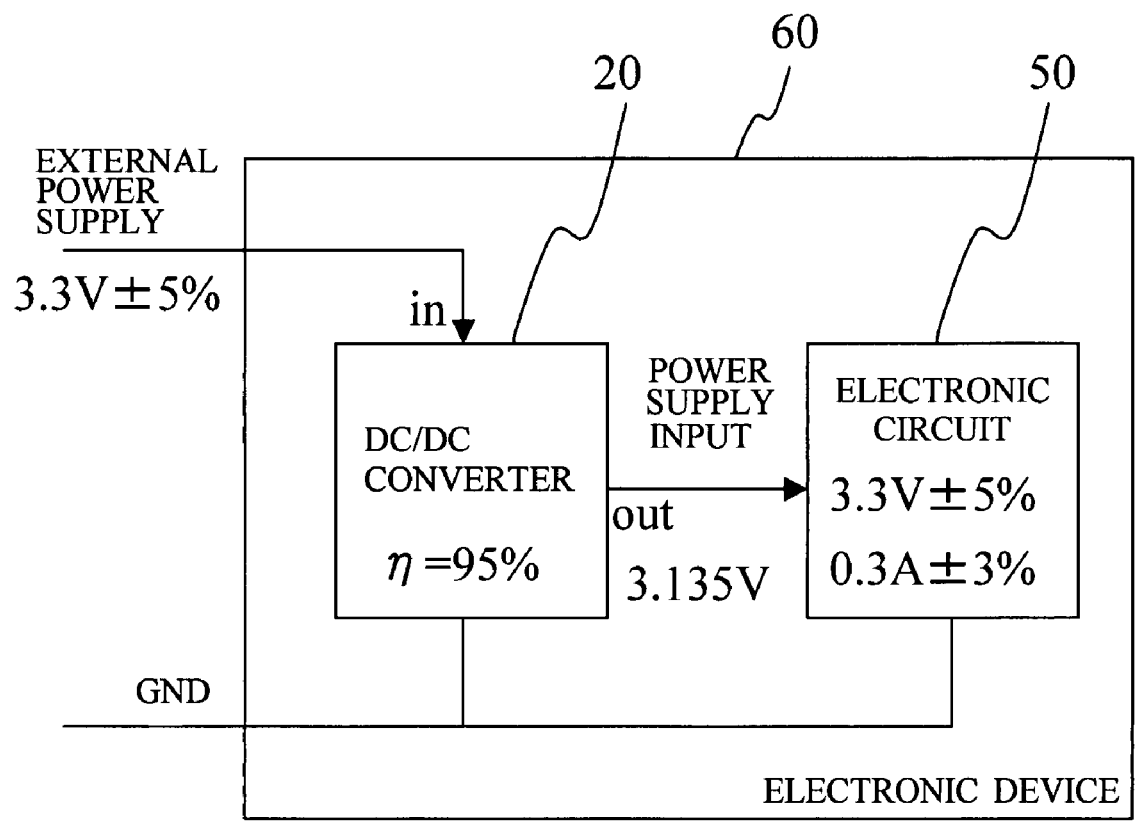
FIG. 4 is a block diagram of explaining effects of the electronic device of the first embodiment.

For example, as shown in FIG. 4, the following parameter values are assumed. The recommended operating condition of the power supply input to the electronic circuit 50 is 3.3 V±5%. When the electronic circuit 50 is supplied with the voltage of the recommended operating condition, current as much as 0.3 A±3% is consumed in the electronic circuit 50. The DC/DC converter 20 has a conversion efficiency η of 95%, and an output of 3.135V (=3.3 V×0.95). The external power supply outputs a voltage of 3.3 V±5%. With the above parameter values, the conventional electronic device 60a shown in FIG. 1 has powers P and Pmax described from expressions (1) and (2):

$$P = 3.3\,V \times 0.3\,A = 0.99\,W$$

$$P\text{max} = (3.3\,V \times 1.05) \times (0.3\,A \times 1.03) = 1.07\,W.$$

In contrast, the electronic device 60 of the first embodiment has powers P and Pmax described from expressions (3) and (4):

$$P = (3.3\,V \times 0.95) \times (0.3\,A \times 0.97)/\eta = 0.96\,W$$

$$P\text{max} = (3.3\,V \times 0.95) \times (0.3\,A \times 0.97)/\eta = 0.96\,W$$

It can be seen from the above that the electronic device 60 of the first embodiment consumes a reduced amount of power when the same external power supply as that for the conventional electronic device 60a is used.

According to the first embodiment, the voltage at the output "out" of the DC/DC converter 20 is set lower than the center value Vc of the recommended operating condition for the power supply input to the electronic circuit 50. It is thus possible to reduce power consumption of the electronic device 60.

In order to realize that the power consumption of the electronic device 60 is less than power consumption when Vc is supplied to the conventional electronic device 60a, the following should be satisfied from expressions (1) and (3), assuming that there is no variation in power consumed in the electronic circuit when the output of the DC/DC converter is Vc (1−λ) where λ is a defined constant, and the power supply voltage applied to the electronic circuit 50 is changed from Vc to Vc (1−λ)

$$Vc \times Ic > (Vc(1-\beta) \times Ic)/\eta$$

that is, $$\eta > (1-\lambda)$$

Assuming that the current consumed in the electronic circuit 50 is Ic (1−γ) (γ is a defined constant) when the voltage of the power supply to the electronic circuit 50 is changed from Vc to Vc (1−λ), the following is obtained from expressions (1) and (3):

$$\eta > (1-\lambda) \times (1-\gamma)$$

Since the product of λ and γ is very small and negligible, the above can be rewritten as follows:

$$\eta > 1 - (\lambda + \gamma)$$

The product λ×γ for the condition shown in FIG. 4 is:

$$\lambda \times \gamma = 0.05 \times 0.03 = 0.0015.$$

It can be seen from the above that the product λ×γ is small and negligible as compared to λ and γ.

As described above, the condition η>(1−λ) or η>1−(λ+γ) reduces the power consumption of the electronic device 60, as compared to the conventional electronic device 60a with Vc of the external power supply.

Figure 5:
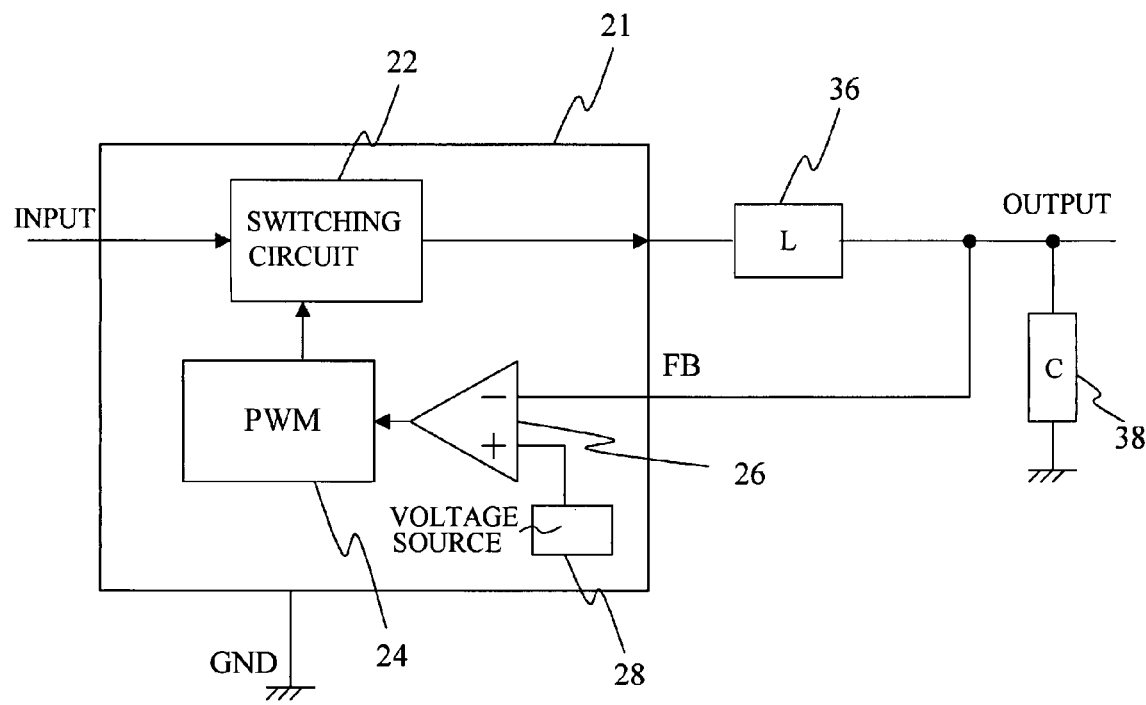
FIG. 5 is a block diagram of a DC/DC converter used for the first embodiment.

FIG. 5 is a block diagram of a step-down type of the DC/DC converter 20 in accordance with the first embodiment. A DC/DC converter circuit 21 includes a switching circuit 22, a PWM (Pulse Width Modulation) generator circuit 24, a differential amplifier 26 and a voltage source 28. The output voltage of the DC/DC converter 20 is applied to a feedback terminal FB thereof. The differential amplifier 26 is supplied with the fed back voltage FB and a reference voltage of the voltage source 28 and amplifies the difference between these voltages. The voltage corresponding to the difference is applied to the PWM generator circuit 24. The PWM generator circuit 24 adjusts the pulse width applied to the switching circuit 22 in accordance with the voltage from the differential amplifier 26. The switching circuit 22 switches the voltage applied to the input terminal of the DC/DC converter 20 on the basis of the pulse signal from the PWM generator circuit 24. An inductor 36 and a capacitor 38 function to remove high-frequency components from the output voltage from the switching circuit 22, and the DC voltage thus regulated is finally output.

The DC/DC converter 20 is not limited to the step-down type but may be of step-up type or Buck-Boost type. When the step-down type DC/DC converter is used, the voltage of the external power supply may be set higher than Vc. When the step-up type DC/DC converter is used, the voltage of the external power supply may be set lower than Vc. When the Buck-Boost type DC/DC converter is used, the voltage of the external power supply may be equal to Vc. Since the step-down type DC/DC converter has a conversion efficiency of 95% or higher, it is suitable for the DC/DC converter 20 employed in the first embodiment. Though the Buck-Boost type DC/DC converter has a conversion efficiency as low as 90 to 95%, the voltage of the external power supply may be set equal to the power supply voltage of the electronic circuit 50. In this regard, this type of DC/DC converter has an interchangeability with the conventional electronic device 60a.

Second Embodiment

Figure 6:
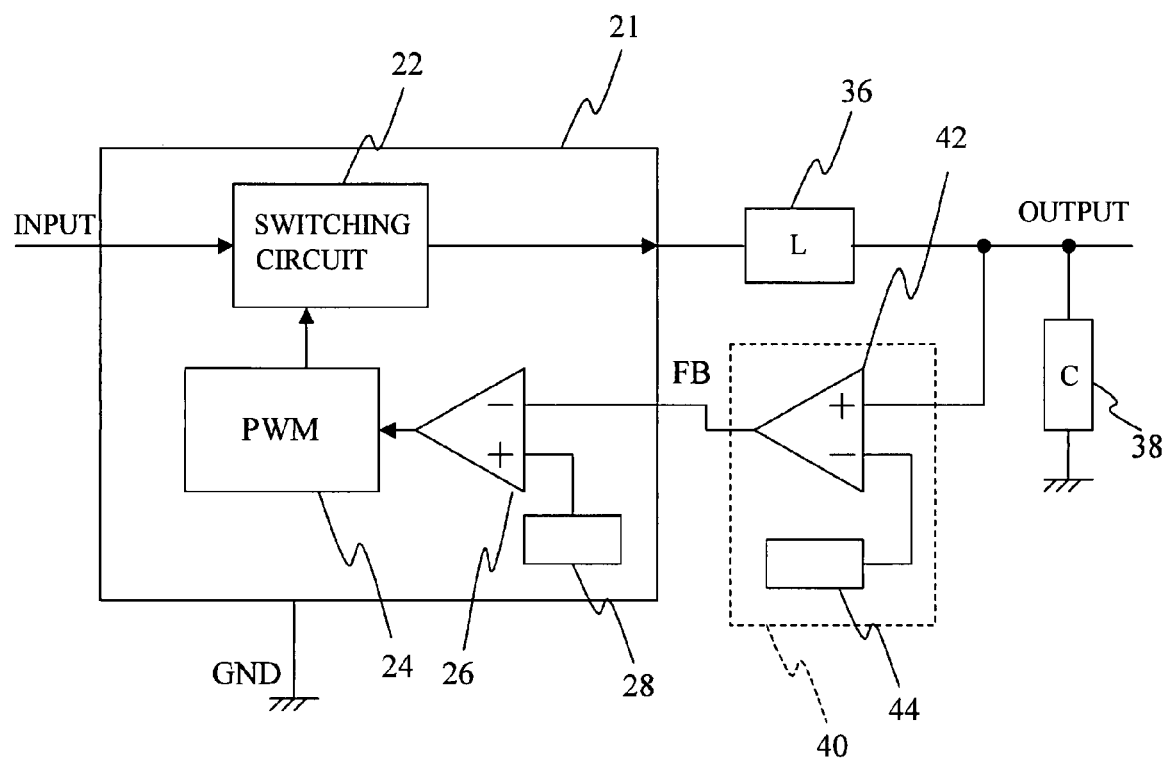
FIG. 6 is a block diagram of a DC/DC converter and its peripheral circuit in accordance with a second embodiment.

A second embodiment has an exemplary structure in which a circuit 40 for improving the accuracy of the output voltage of the DC/DC converter 20 is added thereto. FIG. 6 is a block diagram of a DC/DC converter having the circuit 40 for improving the accuracy of the output voltage of the DC/DC converter 20 shown in FIG. 5. The other structures of the DC/DC converter are the same as those of the DC/DC converter 20 shown in FIG. 5, and a description thereof will be omitted here while the identical reference numerals are assigned to the identical parts. AS shown in FIG. 6, the circuit 40 has a differential amplifier 42 and a voltage source 44. The differential amplifier 42 amplifies the difference between the output voltage of the DC/DC converter 20 and a reference voltage of the voltage source 44. The output voltage of the differential amplifier 42 is applied to the inverting input terminal of the differential amplifier 26 of the DC/DC converter circuit 21 via the feedback terminal FB.

According to the second embodiment, the circuit 40 feeds the output of the DC/DC converter 20 back to the feedback terminal FB. With this structure, it is possible to improve the accuracy of the output of the DC/DC converter 20. Particularly, when the voltage source 44 more accurate than the voltage source 28 is used, the DC/DC converter 20 is capable of regulating the output voltage more accurately. It is thus possible to supply the electronic circuit 50 with a power supply voltage closer to Vmin and reduce power consumed in the electronic circuit 60.

Third Embodiment

Figure 7:
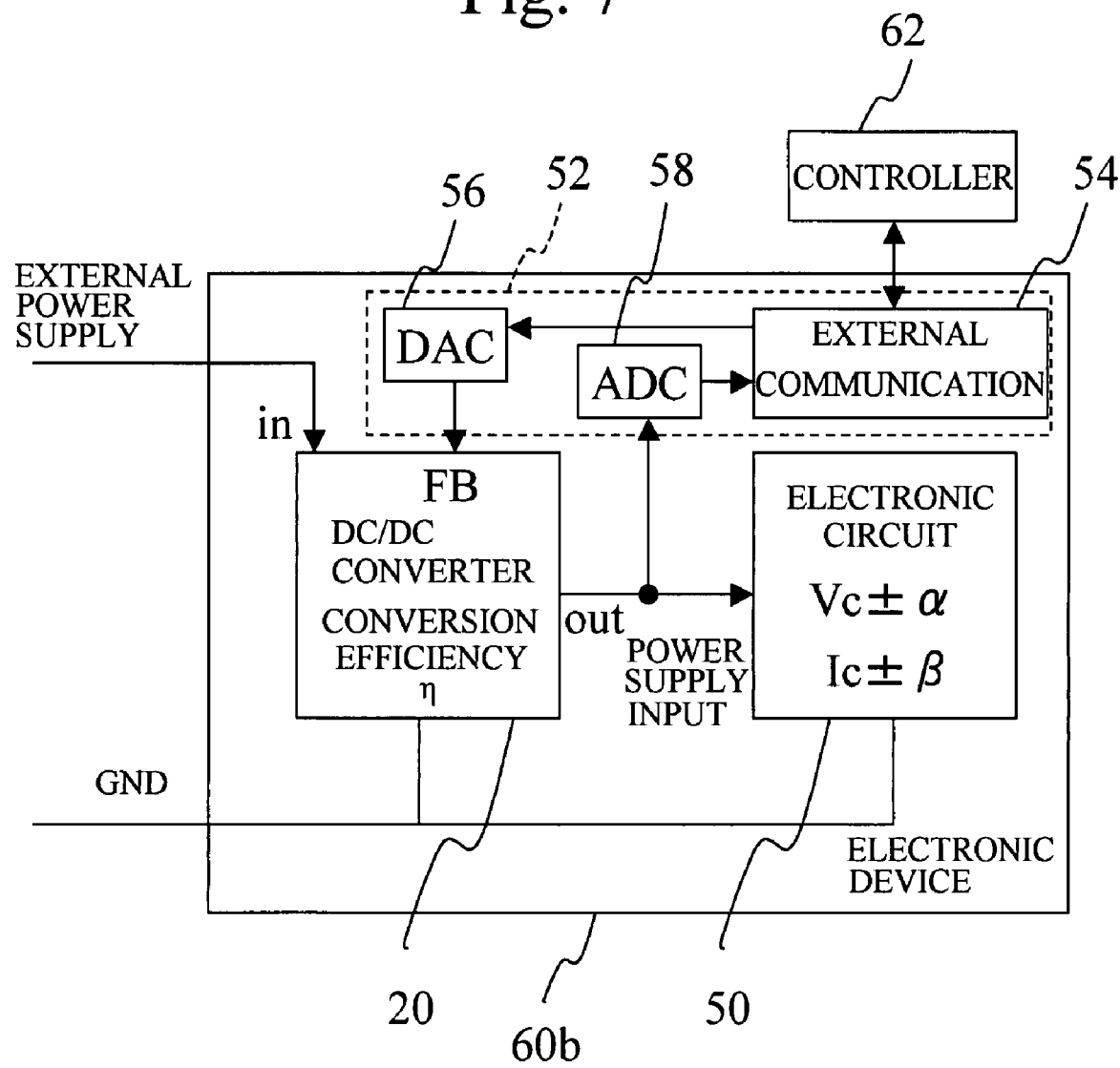
FIG. 7 is a block diagram of an electronic device in accordance with a third embodiment.

A third embodiment has an exemplary structure in which there is provided a voltage setting circuit 52 that outputs a voltage to the feedback terminal FB of the DC/DC converter 20 on the basis of the output of the DC/DC converter 20. FIG. 7 is a block diagram of an electronic device 60b in accordance with the third embodiment. The electronic device 60b has a configuration obtained by adding the voltage setting circuit 52 to the electronic device 60 shown in FIG. 3. The other structures of the electronic device 60b are the same as those of the electronic device 60, and a description thereof will be omitted here while the identical reference numerals are assigned to the identical parts. Referring to FIG. 7, the output voltage of the DC/DC converter 20 is applied to an AD converter 58 of the voltage setting circuit 52. The AD converter 58 converts the output voltage of the DC/DC converter 20 into a digital signal, which is applied to an external communication circuit 54 of the voltage setting circuit 52. The external communication circuit 54 outputs the input digital signal to a controller 62, which may be inside or outside of the electronic device 60b. The controller 62 computes a voltage applied to the feedback terminal FB of the DC/DC converter so that the output voltage of the DC/DC converter 20 is regulated at a defined voltage on the basis of the digital signal from the voltage setting circuit 54. Then, the controller 62 outputs a digital signal corresponding to the voltage thus computed to the external communication circuit 54. Then, the circuit 54 supplies a DA converter 56 of the voltage setting circuit 52 with the digital signal indicative of the voltage applied to the feedback terminal FB. The DA converter 56 converts the digital signal into a corresponding voltage, which is then applied to the DC/DC converter 20.

According to the third embodiment, the voltage setting circuit 52 supplies the feedback terminal FB with the voltage computed so that the output voltage of the DC/DC converter 20 can be regulated at the defined voltage on the basis of the output voltage of the DC/DC converter 20. With this structure, it is possible to further improve the accuracy of the output of the DC/DC converter 20 like the second embodiment. This makes it possible to set the power supply voltage of the electronic circuit 50 closer to the lower limit of the voltage range that realizes the recommended operating condition and to further reduce power consumption of the electronic device 60b. Like the second embodiment, the voltage setting circuit 52 may always feed the output of the DC/DC converter 20 back to the feedback terminal FB thereof. The voltage that is to be fed back to the feedback terminal FB may be determined when the electronic device 60b is powered on or every certain constant time (at the time of calibration). That is, the controller 62 computes, at the time of calibration, the voltage applied to the feedback terminal FB of the DC/DC converter 20 on the basis of the output of the DC/DC converter 20. The voltage setting circuit 52 retains the voltage thus computed and applies it to the feedback terminal FB until the next calibration. The feedback circuit for applying the voltage to the feedback terminal FB of the DC/DC converter 20 is not limited to the aforementioned circuit 40 employed in the second embodiment and the voltage setting circuit 52 in the third embodiment, but may have another configuration.

Fourth Embodiment

Figure 8:
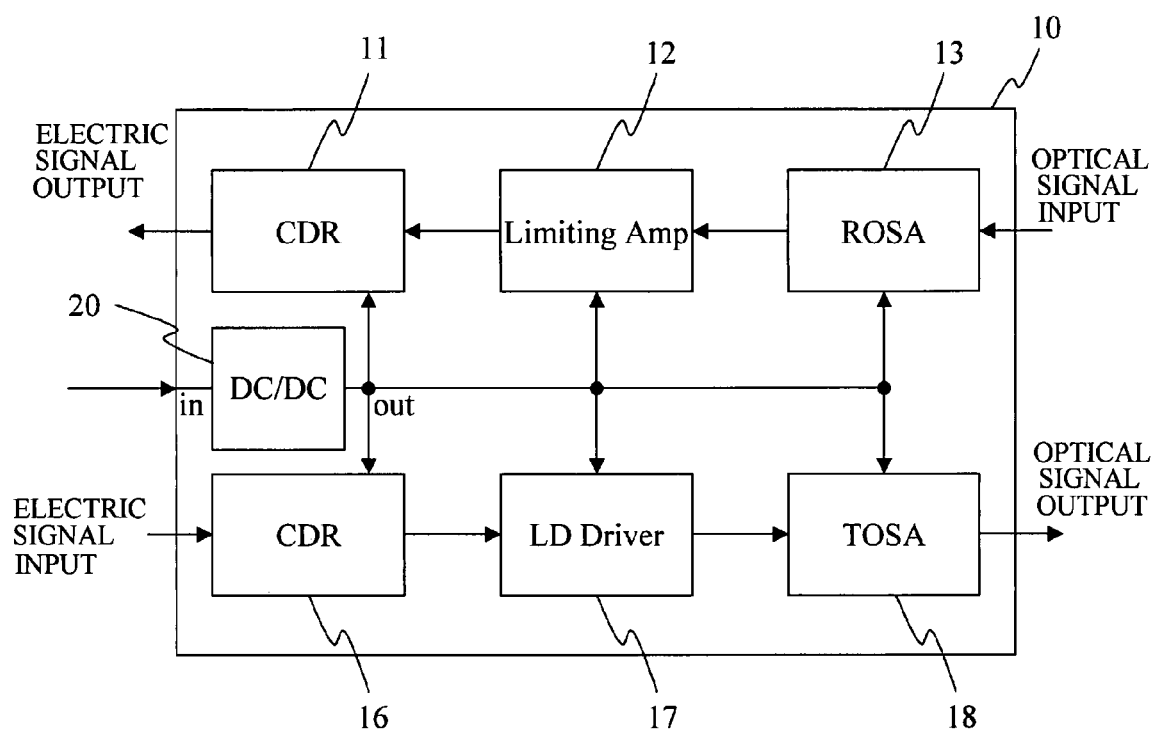
FIG. 8 is a block diagram of an optical semiconductor module in accordance with a fourth embodiment.

A fourth embodiment is an optical semiconductor module, which is an example of the electronic device. FIG. 8 shows an optical module 10 in accordance with the fourth embodiment. The external power supply is applied to the DC/DC converter 20. The output of the DC/DC converter 20 is applied to an electronic circuit that includes CDR (Clock and Data Recovery) circuits 11 and 16, a limiting amplifier 12, an ROSA (Receiver Optical Sub Assembly) 13, an LD (Laser Diode) driver 17, and TOSA (Transmitter Optical Sub Assembly) 18. The DC/DC converter 20 operates in the same manner as that of the first embodiment. The optical semiconductor module 10 has such a function that a laser diode in the TOSA 18 converts an electric input signal into an optical signal, which is then output to an optical fiber, and has another function such that a photodiode in the ROSA 13 converts an optical signal from the optical fiber into an electric signal.

Generally, the optical semiconductor module is required to operate with reduced power consumption. The optical semiconductor module shown in FIG. 8 meets the above requirement. The optical semiconductor module of the present invention may include either a semiconductor light-emitting device such as a semiconductor laser diode or LED, or a semiconductor light-receiving device such as a photodiode, or both. Besides the fourth embodiment, the optical semiconductor module of the present invention may include an optical semiconductor module capable of converting an electric signal into an optical signal, or another optical semiconductor module capable of converting an optical signal into an electric signal. The electronic device of the second or third embodiment may be embedded in the optical semiconductor module.

Besides the optical semiconductor device, the electronic devices of the first through third embodiments may be a portable electronic device or part thereof, such as a notebook personal computer, a portable phone, radio, audio, camera or PDA. Generally, the portable electronic device is particularly required to operate with reduced power consumption. The portable electronic device of the present invention consumes reduced power and operates more efficiently. Further, the present invention may be an in-vehicle electronic device such as a car navigation system, a car audio system or an in-vehicle DVD.

The recommended operating conditions for the electronic circuits guarantee the stable operation thereof. When an electronic circuit is supplied with a power supply lower than the center value of the recommended operating condition, the electronic circuit may operate unstably. However, the unstable operation should be avoided. The DC/DC converter is originally a power supply circuit capable of setting up the voltage. The setting up of voltage is realized by storing charge from the external power supply in a capacitor and then discharging it. The electronic devices of the first through third embodiments have the DC/DC converters via which the external power is applied to the electronic circuits. It is thus possible to stabilize the voltage of the power supply and supply the electronic circuit with the power supply lower than the center value of the voltage range that meets the recommended operating condition.

The present invention is not limited to the specifically described embodiments, but include other embodiments and variations without departing from the scope of the present invention.

The present application is based on Japanese Patent Application No. 2006-096050 filed Mar. 30, 2006, the entire disclosure of which is hereby incorporated by reference.

What is claimed is:

1. An electronic device comprising:
a DC/DC converter supplied with an external power supply; and
an electronic circuit having a power supply input to which an output of the DC/DC converter is supplied,
a converted voltage that is the output of the DC/DC converter being lower than a center value of a recommended operating condition for a voltage of the power supply input of the electronic circuit,
wherein the following condition is satisfied:

$$\eta > (1-\lambda)$$

where $\eta$ is a conversion efficiency of the DC/DC converter, Vc is the center value of the recommended operating condition, and $\lambda$ is a defined constant so that the converted voltage is described as Vc$(1-\lambda)$.

2. The electronic device as claimed in claim 1, wherein the converted voltage is a lower limit of the recommended operating condition for the voltage of the power supply input of the electronic circuit.

3. The electronic device as claimed in claim 1, further comprising a feedback circuit that feeds the output of the DC/DC converter back to a feedback terminal of the DC/DC converter.

4. An electronic device, comprising:
a DC/DC converter supplied with an external power supply; and
an electronic circuit having a power supply input to which an output of the DC/DC converter is supplied,
a converted voltage that is the output of the DC/DC converter being lower than a center value of a recommended operating condition for a voltage of the rower supply input of the electronic circuit,
wherein the following condition is satisfied:

$$\eta > 1(\lambda + \gamma)$$

where $\eta$ is a conversion efficiency of the DC/DC converter, Vc is the center value of the recommended operating condition, $\lambda$ is a defined constant so that the converted voltage is described as Vc$(1-\lambda)$, $\gamma$ is a defined constant so that current consumed in the electronic circuit for the converted voltage Vc$(1-\lambda)$ is Ic$(1-\gamma)$, and Ic is a current consumed in the electronic circuit for Vc.

5. An optical semiconductor module comprising:
a conversion circuit that performs a conversion between an electric signal and an optical signal; and
an electronic device communicating with the conversion circuit,
the electronic device including:
a DC/DC converter supplied with an external power supply; and
an electronic circuit having a power supply input to which an output of the DC/DC converter is supplied,
a converted voltage that is the output of the DC/DC converter being lower than a center value of a recommended operating condition for a voltage of the power supply input of the electronic circuit,
wherein the following condition is satisfied:

$$\eta > (1-\lambda)$$

where $\eta$ is a conversion efficiency of the DC/DC converter, Vc is the center value of the recommended operating condition, and $\lambda$ is a defined constant so that the converted voltage is described as Vc$(1-\lambda)$.

6. A method for controlling an electronic device equipped with an electronic circuit comprising:
inputting an external power supply;
converting a voltage of the external power supply into a voltage lower than a center value of a recommended operating condition for a voltage of the power supply input of the electronic circuit; and
supplying a converted voltage to the electronic circuit,
wherein the following condition is satisfied:

$$\eta > (1-\lambda)$$

where $\eta$ is a conversion efficiency of converting the voltage, Vc is the center value of the recommended operating condition, and $\lambda$ is a defined constant so that the converted voltage is described as Vc$(1-\lambda)$.

7. The method as claimed in claim 6, wherein converting the voltage includes a step of converting the voltage of the external power supply into a lower limit of the recommended operating condition for the voltage of the power supply input of the electronic circuit.

8. A method for controlling an electronic device equipped with an electronic circuit comprising:

inputting an external power supply;

converting a voltage of the external power supply into a voltage lower than a center value of a recommended operating condition for a voltage of the power supply input of the electronic circuit; and supplying a converted voltage to the electronic circuit, wherein the following condition is satisfied:

$$\eta > 1 - (\lambda + \gamma)$$

where $\eta$ is a conversion efficiency of converting the voltage, Vc is the center value of the recommended operating condition, $\lambda$ is a defined constant so that the converted voltage is described as $Vc(1-\lambda)$, $\gamma$ is a defined constant so that current consumed in the electronic circuit for the converted voltage $Vc(1-\lambda)$ is $Ic(1-\gamma)$, and Ic is a current consumed in the electronic circuit for Vc.

* * * * *